(12) United States Patent
Konishi et al.

(10) Patent No.: US 9,603,345 B2
(45) Date of Patent: Mar. 28, 2017

(54) AQUATIC ORGANISM REARING SYSTEM AND AQUATIC ORGANISM REARING METHOD

(71) Applicant: JAPAN AGENCY FOR MARINE-EARTH SCIENCE AND TECHNOLOGY, Yokosuka-shi, Kanagawa (JP)

(72) Inventors: Masaaki Konishi, Kanagawa (JP); Tomoo Watsuji, Kanagawa (JP)

(73) Assignee: JAPAN AGENCY FOR MARINE-EARTH SCIENCE AND TECHNOLOGY, Kanagawa (JP)

( * ) Notice: Subject to any disclaimer, the term of this patent is extended or adjusted under 35 U.S.C. 154(b) by 151 days.

(21) Appl. No.: 14/349,601

(22) PCT Filed: Oct. 3, 2012

(86) PCT No.: PCT/JP2012/075641
§ 371 (c)(1),
(2) Date: Apr. 3, 2014

(87) PCT Pub. No.: WO2013/051605
PCT Pub. Date: Apr. 11, 2013

(65) Prior Publication Data
US 2014/0245963 A1    Sep. 4, 2014

(30) Foreign Application Priority Data

Oct. 3, 2011 (JP) .................. 2011-219498

(51) Int. Cl.
*A01K 63/04* (2006.01)
*A01K 63/06* (2006.01)
*A01K 61/00* (2017.01)

(52) U.S. Cl.
CPC ............ *A01K 63/042* (2013.01); *A01K 61/00* (2013.01); *A01K 63/06* (2013.01); *A01K 63/065* (2013.01)

(58) Field of Classification Search
CPC ........ A01K 63/04; A01K 63/06; A01K 63/00; A01K 63/02; A01K 67/00; A01K 63/042; A01K 63/003; A01K 61/00
(Continued)

(56) References Cited

U.S. PATENT DOCUMENTS 4,055,145 A * 10/1977 Mager .................... A01K 61/00
119/204
4,182,268 A * 1/1980 Berger ................. A01K 63/042
119/226
(Continued)

FOREIGN PATENT DOCUMENTS

JP          8-173988 A      7/1996
JP          9-117235 A      5/1997
(Continued)

*Primary Examiner* — Trinh Nguyen
(74) *Attorney, Agent, or Firm* — Sughrue Mion, PLLC (57) ABSTRACT

An object is to maintain the hydrogen sulfide concentration in rearing water at a constant value without measuring the hydrogen sulfide concentration in the rearing water.

The present invention includes: a water tank 10 that stores rearing water W leaving a gas phase at an upper part; a gas sensor 50 to detect hydrogen sulfide gas concentration in the gas phase G; and a hydrogen sulfide supplying means F to supply hydrogen sulfide to the rearing water W based on a detection signal output from the gas sensor 50 so as to maintain a hydrogen sulfide concentration in the rearing water W at a predetermined value.

19 Claims, 6 Drawing Sheets

(58) Field of Classification Search
USPC ....... 119/204, 206, 207, 209, 211, 215, 217,
119/224, 226, 227, 234, 236, 245, 248,
119/251, 252, 259, 260, 261, 262, 263,
119/268
See application file for complete search history.

(56) References Cited

U.S. PATENT DOCUMENTS

| | | | | |
|---|---|---|---|---|
| 5,353,745 | A | * 10/1994 | Fahs, II | A01K 63/04 119/226 |
| 2002/0185080 | A1 | * 12/2002 | Ortiz | A01K 63/04 119/245 |
| 2006/0048714 | A1 | * 3/2006 | Kamigauchi | A01K 61/008 119/217 |
| 2006/0191828 | A1 | * 8/2006 | Cummins | B01D 33/11 210/97 |
| 2006/0225661 | A1 | * 10/2006 | Riemma | A01K 63/04 119/245 |
| 2009/0188299 | A1 | * 7/2009 | Komura | G01N 1/2226 73/23.41 |
| 2010/0058992 | A1 | 3/2010 | Miyake et al. | |

FOREIGN PATENT DOCUMENTS

| | | | |
|---|---|---|---|
| JP | 11-169011 A | | 6/1999 |
| JP | 2002-186977 | * | 7/2002 |
| JP | 2002-186977 A | | 7/2002 |
| JP | 2006-211914 | * | 8/2006 |
| JP | 2006-211914 A | | 8/2006 |
| JP | 2007-152275 | * | 6/2007 |
| JP | 2007-152275 A | | 6/2007 |
| JP | 2009-247255 | * | 10/2009 |
| JP | 2009-247255 A | | 10/2009 |
| WO | 2008/114720 A1 | | 9/2008 |

\* cited by examiner

AQUATIC ORGANISM REARING SYSTEM AND AQUATIC ORGANISM REARING METHOD

CROSS REFERENCE TO RELATED APPLICATIONS

This application is a National Stage of International Application No. PCT/JP2012/075641, filed on Oct. 3, 2012, which claims priority from Japanese Patent Application No. 2011-219498, filed on Oct. 3, 2011, the contents of all of which are incorporated herein by reference in their entirety.

TECHNICAL FIELD

The present invention relates to an aquatic organism rearing system suitable for rearing aquatic organisms, in particular deep-sea organisms of chemosynthetic ecosystems that utilize hydrogen sulfide in the environment around a hydrothermal/cold vent or the like, and to an aquatic organism rearing method for such aquatic organisms.

BACKGROUND ART

Conventional devices for rearing deep-sea organisms of this kind are disclosed in Patent Literatures 1 and 2, where they are referred to as an "in-water tank local temperature zone forming apparatus" and an "aquatic organism rearing apparatus" respectively.

The in-water tank local temperature zone forming apparatus disclosed in Patent Literature 1, or an rearing apparatus for aquatic organisms, in particular deep-sea organisms, includes a water tank made of a pressure tight container, a water stream generator to generate a water stream in one direction (lateral direction) in the water tank, a temperature zone generator to define a local temperature zone by heating or cooling a part of the water stream flowing on the bottom of the water tank, such as heater, and a temperature zone retainer to retain the local temperature zone defined by the temperature zone generator by preventing the temperature zone from being diffused over the whole water tank, such as nozzle. It is intended that deep-sea organisms such as shells that are less likely to be swept away by the water stream are reared in the temperature retainer.

The aquatic organism rearing apparatus disclosed in Patent Literature 2 includes a main water tank to house an aquatic organism together with water, a hot water supplying means to jet hot water upward from an jetting nozzle disposed on the bottom of the main water tank, and a hot water discharging means disposed at the upper part of the main water tank to discharge the rising hot water to the outside. The apparatus is configured to form a cold water zone and a local hot water zone in the water.

CITATION LIST

Patent Literature

Patent Literature 1: Japanese Patent Unexamined Publication No. Hei9-117235
Patent Literature 2: International Publication WO 2008/114720

SUMMARY OF INVENTION

Technical Problem

However, for the purpose of rearing organisms of chemosynthetic ecosystems that utilize hydrogen sulfide, the above-described in-water tank local temperature zone forming apparatus and aquatic organism rearing apparatus disclosed in Patent Literatures 1 and 2 cannot add hydrogen sulfide gas, or even if they can supply hot water containing hydrogen sulfide by means of adding sodium sulfide to the gas, they cannot control the hydrogen sulfide concentration in the rearing apparatuses. Therefore, there is a difficulty in supplying hydrogen sulfide gas in an appropriate amount.

It is an object of the present invention to provide an aquatic organism rearing system that can maintain the hydrogen sulfide concentration in rearing water at a constant value without measuring the hydrogen sulfide concentration in the rearing water, and an aquatic organism rearing method thereof.

Solution to Problem

An aquatic organism rearing system for solving the above-described problem includes: a water tank that stores rearing water leaving a gas phase at an upper part; a gas sensor to detect the hydrogen sulfide gas concentration in the gas phase; and a hydrogen sulfide supplying means to supply hydrogen sulfide to the rearing water based on a detection signal output from the gas sensor so as to maintain the hydrogen sulfide concentration in the rearing water at a constant value.

An aquatic organism rearing method according to the present invention for solving the above-described problem, which uses the above-described aquatic organism rearing apparatus, includes: detecting the hydrogen sulfide gas concentration in the gas phase by the gas sensor; and supplying hydrogen sulfide to the rearing water by the hydrogen sulfide supplying means based on the detection signal output from the gas sensor so as to maintain the hydrogen sulfide concentration in the rearing water at a constant value.

Advantageous Effects of Invention

According to the present invention, the hydrogen sulfide concentration in rearing water can be maintained at a constant value without measuring the hydrogen sulfide concentration in the rearing water.

EMBODIMENTS OF INVENTION

Figure 1:
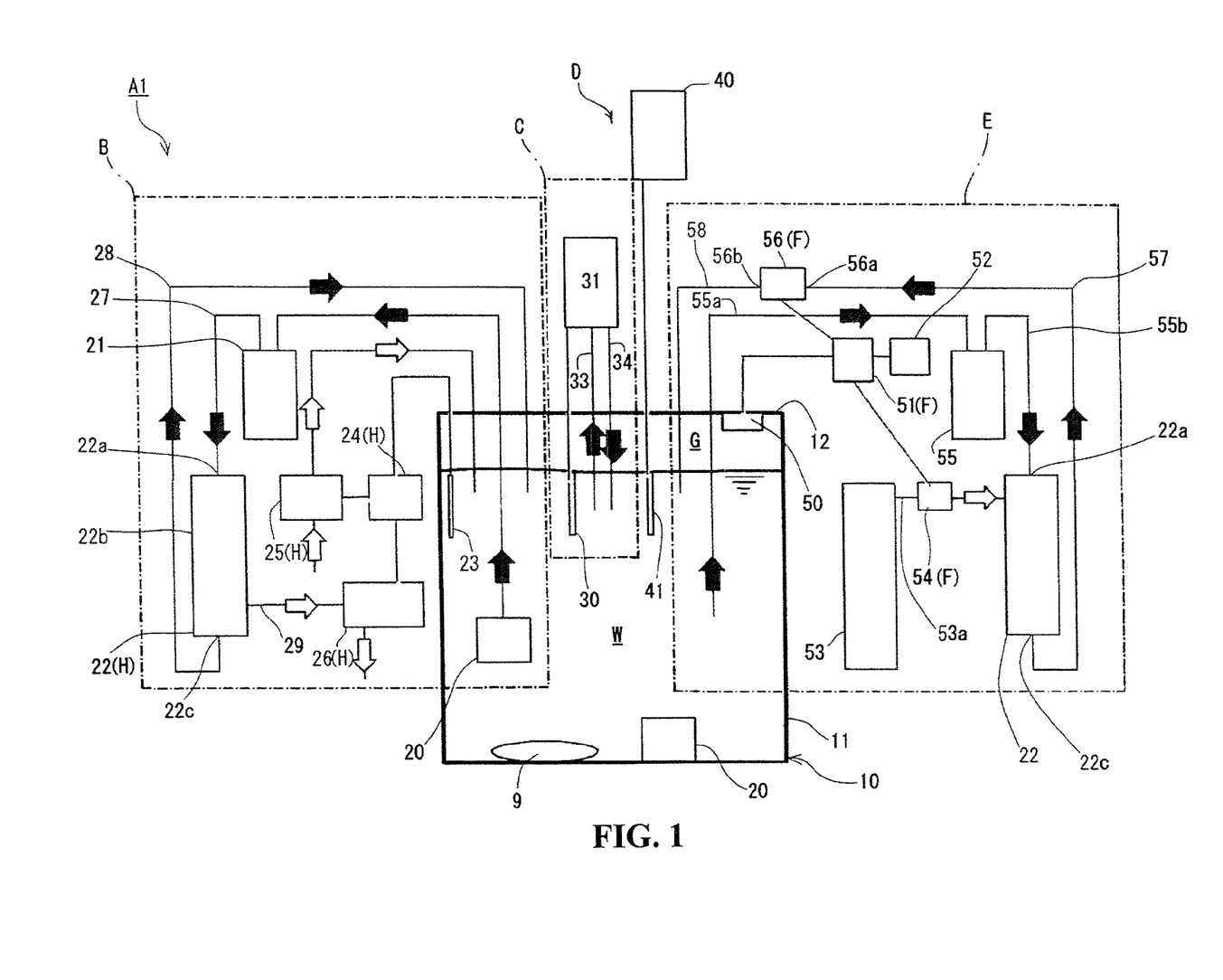
FIG. 1 is a block diagram illustrating the schematic configuration of an aquatic organism rearing apparatus according to an embodiment of the present invention.

Hereinafter, embodiments of the present invention will be described with reference to the drawings. FIG. 1 is a block diagram illustrating the schematic configuration of an aquatic organism rearing system according to an embodiment of the present invention.

In FIG. 1, the solid lines show water flow paths, the dashed lines show gas flow paths, and the dot lines shows electric signal paths. Further, the black arrows indicate the flow direction of rearing water, and the white arrows indicate the flow direction of gas.

Generally speaking, the aquatic organism rearing system A1 according to an embodiment of the present invention controls the level of hydrogen sulfide, which is highly toxic to living organisms, in a continuous manner at a low concentration for the purpose of rearing living organisms of chemosynthetic ecosystems, which are some of aquatic organisms that utilize hydrogen sulfide.

That is, it was found that as long as the physical conditions such as temperature and pH stay constant, if the relationship between the hydrogen sulfide concentration in rearing water W and the hydrogen sulfide gas concentration in a gas phase formed above the rearing water is determined in advance, the hydrogen sulfide concentration in the rearing water can be estimated and controlled from a measured value of the hydrogen sulfide gas concentration.

In this embodiment, the "rearing water W" is artificial sea water, and the "aquatic organisms" are deep-sea organisms, but these are not limited thereto. For example, the rearing water W may be sea water.

Further, sea water and artificial sea water may contain an additive such as trace metal component and organic component according to the characteristics of the living organisms in captivity.

Living organisms of chemosynthetic ecosystems utilizing hydrogen sulfide that can be reared include deep-sea organisms that inhabit deep sea at a depth of 200 m or deeper, living organisms that inhabit the surrounding area of a hydrothermal vent or a cold seep.

Specifically, such living organisms of chemosynthetic ecosystems include *Gandalfus yonohana, Shinkaia crosnieri, Munidopsis* spp., *Alvinocaris longirostris*, hydrothermal-vent barnacles, tubeworms, *Bathymodiolus* spp., *Calyptogena soyoae, Osedax japonicas, Adipicola pacifica*, living organisms of whale-fall communities, *Lithodes turritus Ortmann, Zoarcidae* spp., and the like.

As illustrated in FIG. 1, the aquatic organism rearing system A1 according to an embodiment of the present invention includes, as the specific configuration thereof, a water tank 10, an oxygen controlling device B, a temperature controlling device C, a pH display device D and a hydrogen sulfide controlling device E.

The water tank 10 houses an aquatic organism together with the rearing water W in the amount that leaves a gas phase (space) at the upper part. For example, the water tank 10 is composed of a body 11 having a size of approximately 100×75×75 cm and a lid 12 that gas-hermetically seals an upper opening of the body 11.

An optimal dissolved oxygen concentration for rearing desirably ranges from 6 to 7 ppm in view of the dissolved oxygen concentration in deep-sea water.

The dissolved oxygen in the rearing water W is consumed by breathing of aquatic organisms or bacteria, oxidation of hydrogen sulfide and the like. Meanwhile, if the temperature of the rearing water W is low, the dissolved oxygen level may become too high because oxygen in the air dissolves more easily.

To cope with this, the oxygen controlling device B of this embodiment includes a rearing water circulation system including a water pump 20, a pre-filter 21 and a hollow fiber module 22, and an oxygen level controlling system including a dissolved oxygen electrode 23, a dissolved oxygen meter 24, an air pump 25 and a vacuum pump 26.

The detailed configuration of the rearing water circulating system is as follows. The water pump 20 is placed in the rearing water W, and a supply pipe 27 connects between the water pump 20 and a water inlet 22a of the hollow fiber module 22. The pre-filter 21 is disposed in the supply pipe 27.

The pre-filter 21 removes wastes and the like contained in the rearing water W that is pumped by the water pump 20.

The hollow fiber module 22 of the oxygen controlling device B is an oxygen removing device for removing dissolved oxygen in the rearing water W, where a hollow fiber tube (not shown) is housed in a cylindrical body 22b so as to remove oxygen contained in the rearing water flowing through the hollow fiber tube.

A water outlet 22c of the hollow fiber module 22 is connected to an end of a return pipe 28, and the other end of the return pipe 28 is placed in the rearing water W, so that the deaerated rearing water W supplied from the follow fiber module 22 returns.

The body 22b of the hollow fiber module 22 is connected to the vacuum pump 26 via a connection pipe 29 so that the dissolved oxygen can be removed from the rearing water flowing through the hollow fiber module 22.

The dissolved oxygen electrode 23 detects the dissolved oxygen in the rearing water W stored in the water tank 10, and is placed in the rearing water W.

The dissolved oxygen electrode 23 is connected to an input of the dissolved oxygen meter 24, and an output of the dissolved oxygen meter 24 is connected to the vacuum pump 26 and the air pump 25.

The vacuum pump 26 removes dissolved oxygen in the rearing water W flowing through the hollow fiber module 22 under reduced pressure, and is operated in an on-off manner by the dissolved oxygen meter 24.

The air pump 25 supplies oxygen to the rearing water W stored in the water tank 10, and is connected to one end of a supply pipe 29. The other end of the supply pipe 29 is placed in the rearing water W.

The dissolved oxygen meter (dissolved oxygen controller) 24 calculates the dissolved oxygen level detected by the dissolved oxygen electrode 23, and also has a function of controlling the dissolved oxygen level by correctly operating the air pump 25 and the vacuum pump 26 connected to the output thereof in an on-off manner according to the calculated value of the dissolved oxygen level.

That is, the air pump 25 and the vacuum pump 26 are operated independently from each other in an on-off manner so that the dissolved oxygen level is maintained at an optimal level for the aquatic organism.

In this embodiment, the hollow fiber module (oxygen removing device) 22, the air pump 25, the vacuum pump 26 and the dissolved oxygen controller (dissolved oxygen meter) 24 constitute a dissolved oxygen level controlling means H that controls the dissolved oxygen level in the rearing water W.

The temperature controlling device C includes a temperature sensor 30 to detect the temperature of the rearing water W and a temperature controller 31 to control the temperature of the rearing water W according to the detected value of the temperature. In this embodiment, a thermocouple is used for the temperature sensor 30, but any known device may also be used.

The temperature controller 31 has a function of heating and cooling the rearing water W, from which an intake pipe 33 and drainage pipe 34 are hung.

That is, the rearing water W taken through the intake pipe 33 is heated or cooled. Then, the temperature-controlled rearing water W is returned to the water tank 10 through the drainage pipe 34. By the temperature controlling device C, the temperature of the rearing water W can be constantly maintained at an optimal temperature for the aquatic organism.

The pH display device D, which is placed in the rearing water W, includes a pH electrode 41 to detect the pH of the rearing water W and a body 40 to display the pH of the rearing water W detected by the pH electrode 41. Because the pH of the rearing water D can thus be visually checked, it becomes easier to rear the aquatic organism.

If a deep-sea organism is reared, the pH of the rearing water desirably ranges approximately from pH 7.6 to 8.4, but is not limited thereto.

If a deep-sea organism is reared, calcium carbonate or a calcium carbonate-based pH adjusting member 9 is disposed in the rearing water W.

The pH adjusting member 9 is made of, for example, coral sand or the like. The pH adjusting member 9 placed in the rearing water W can maintain the pH of the rearing water W within the above-described range from pH 7.6 to pH 8.4.

The hydrogen sulfide controlling device E includes: a hydrogen sulfide gas measuring system including a gas sensor 50 and a relay 51 and a recorder 52 connected to the gas sensor 50; and a hydrogen sulfide gas level controlling system including a hydrogen sulfide cylinder 53, an solenoid valve 54, a hollow fiber module 22, which is identical to the above-described module, a pre-filter 55 and a tubing pump 56.

The detailed configuration of the hydrogen sulfide gas measuring system is as follows.

The gas sensor 50, which detects hydrogen sulfide gas, is disposed in the gas phase G in the water tank 10 and is connected to an input terminal of the relay 51.

The gas sensor 50 may use any gas-phase hydrogen sulfide detection method known in the art that can convert the detection into an electric signal. For example, it can employ any method that can continuously detect the gas concentration and can output an electric signal or convert the detection into an electric signal, such as a method of using a copper hydroxide thin film applied on a base and measuring change of the thin surface layer by means of infrared absorption spectrometry, a method of using stoichiometrically imperfect molybdenum trioxide and measuring the gas mixture concentration from change of the electric properties thereof, and a method of using a solid electrolyte (all not shown).

Typically, the hydrogen sulfide concentration in the rearing water W can be easily detected at low cost by using a semiconductor sensor, which is also used in gas alarms and the like.

The recorder (date logger) 52 records the detected hydrogen sulfide concentration.

The relay 51 has a function of operating the solenoid valve 54 and the tubing pump 56 in an on-off manner according to the detection signal of the gas sensor 50.

The detailed configuration of the hydrogen sulfide gas level controlling system is as follows.

The hydrogen sulfide cylinder 53 is filled with a necessary amount of hydrogen sulfide gas, and is connected to a body 22*b* of the hollow fiber module 22 via a connection pipe 53*a*.

The hollow fiber module 22 of the hydrogen sulfide gas level controlling system is a hydrogen sulfide gas supplying device for supplying hydrogen sulfide gas to the rearing water. As with the above-described module, a hollow fiber tube (not shown) is housed in the cylindrical body 22*b*.

The solenoid valve 54 releases and shuts off the supply of hydrogen sulfide gas from the hydrogen sulfide cylinder 53 to the hollow fiber module 22. The solenoid valve 54 is disposed in the connection pipe 53*a*. By being operated by the relay 51 in an on-off manner, the solenoid valve 54 releases and shuts off the supply of the pressurized hydrogen sulfide gas from the hydrogen sulfide cylinder 53 to the hollow fiber module 22.

The pre-filter 55 removes wastes and the like contained in the rearing water W that is pumped by the tubing pump 56, and an inlet (not shown) thereof is connected to a proximal end of a suction pipe 55*a*. A distal end of the suction pipe 55*a* is placed in the rearing water W.

An outlet (not shown) of the pre-filter 55 is connected to an inlet of the hollow fiber module 22 via a connection pipe 55*b*.

Further, an outlet 22*c* of the hollow fiber module 22 is connected to an inlet 56*a* of the tubing pump 56 via a connection pipe 57. An outlet 56*b* of the tubing pump 56 is connected to a proximal end of a water pipe 58, and an end opening of the water pipe 58 is placed in the rearing water W.

The tubing pump 56 is a circulation pump for circulating the rearing water W, which pinches and strokes a flexible tube by a roller (both not shown) so as to pump out the rearing water W contained in the tube. By using the tubing pump 56, the rearing water W does not contact with the circulation pump itself. Furthermore, because there is no valve structure, the rearing water W is not subject to pulses and impacts.

In this embodiment, the relay 51, the solenoid valve 54 and the tubing pump 56 constitute a hydrogen sulfide supplying means F that supplies hydrogen sulfide to the rearing water W so as to maintain the hydrogen sulfide concentration in the rearing water W.

In this embodiment, the term "hydrogen sulfide concentration in the rearing water" is intended to mean a hydrogen sulfide concentration appropriate for the aquatic organism in the rearing water W. This feature enables continuously rearing chemosynthetic aquatic organisms over a long period.

An aquatic organism rearing method using the above-described aquatic organism rearing system A1 includes detecting the hydrogen sulfide gas concentration in the gas phase G by the gas sensor 50, and supplying hydrogen sulfide to the rearing water W based on the detection signal output from the gas sensor 50 so as to maintain the hydrogen sulfide concentration in the rearing water W at a constant value.

The operation of the aquatic organism rearing system A1 having the above-described configuration will be described.

The operation of the oxygen controlling device B is as follows.

If the dissolved oxygen in the rearing water W is in a shortage, the air pump 25 is put into operation to supply air to the rearing water.

In contrast, if the dissolved oxygen in the rearing water W is excessive, the vacuum pump 26 is put into operation to remove oxygen from the rearing water W that flows through the hollow fiber module 22 so as to decrease the dissolved oxygen concentration.

The operation of the hydrogen sulfide controlling device C is as follows.

If the dissolved hydrogen sulfide in the rearing water W is in a shortage, the relay 51 puts the solenoid 54 and the tubing pump 56 into operation to supply hydrogen sulfide to the rearing water W, so as to maintain the hydrogen sulfide concentration in the rearing water W.

Advantageous effects of the aquatic organism rearing system A1 and rearing method having the above-described configuration will be described.

A wide variety of living organisms of chemosynthetic ecosystems that utilize hydrogen sulfide can be reared for a long period.

That is, hydrogen sulfide gas can be supplied in an appropriate amount by estimating the hydrogen sulfide concentration in the rearing water from the concentration of hydrogen sulfide gas present in the gas phase at the upper part of the water tank measured by the gas sensor, and controlling the gas supply valve, the circulation pump and the like through the relay according to the electrical change of the semiconductor gas sensor. Therefore, hydrogen sulfide gas can be continuously supplied in an appropriate amount for a long period, which enables rearing chemosynthetic aquatic organisms for a long period.

Because the hollow fiber module is used for supplying hydrogen sulfide to the rearing water, excess hydrogen sulfide is not emitted out of the system, which improves the safety of the apparatus.

Example 1

Figure 2:
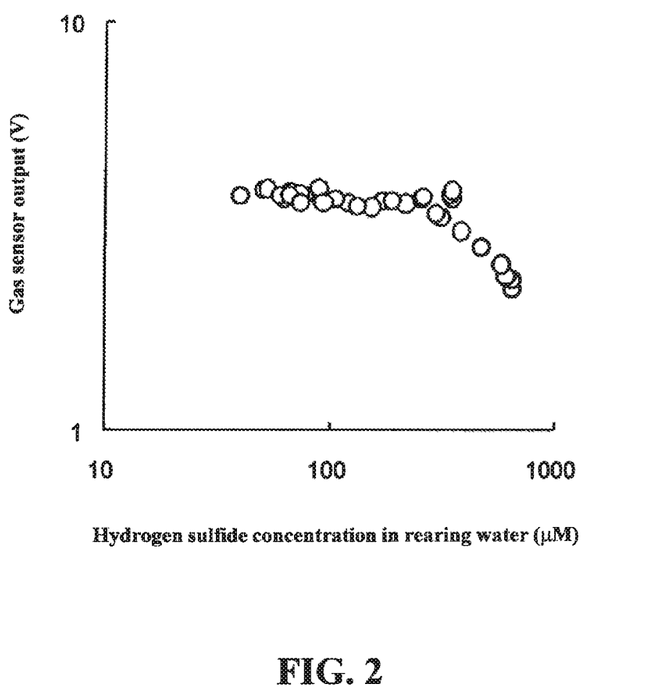
FIG. 2 is a double logarithmic plot of the hydrogen sulfide concentration in artificial sea water at 5-5.4° C. and pH 7.6 measured by colorimetric determination versus the output value of a gas sensor.

FIG. 2 is a double logarithmic plot of the hydrogen sulfide concentration in artificial sea water at 5-5.4° C. and pH 7.6 measured by colorimetric determination versus the output value of the gas sensor.

To determine the relationship between the hydrogen sulfide concentration in the rearing water W and the output of the gas sensor, the output of the gas sensor was measured in different conditions when the rearing water W contained hydrogen sulfide at certain concentrations.

The hydrogen sulfide concentration in the rearing water W was measured by the diamine method, an improved methylene blue method.

The volume of the rearing water was 150 liters, and the apparatus was set such that the temperature, dissolved oxygen concentration and pH of the rearing water W were maintained respectively at 5° C., 6.4 and 7.4. The gas sensor was set such that the output reaches 4.0 V in the clean air.

The measurement of hydrogen sulfide concentration by the diamine method was carried out as follows.

In 50 ml of 6 N hydrogen chloride solution, 1.8 g of N,N-dimethyl-phenylenediamine sulfate and 3.0 g of ferric chloride hexahydrate were completely dissolved to prepare a mixed diamine reagent.

Each rearing water (500 μl) was added to 50 μl of the coloring reagent. The mixture was stirred and then left for a minute or two.

The mixture was diluted by 11 times with distilled water, and the absorbance at the wavelength of 670 nm was measured by a spectrophotometer. A standard curve was determined using standard solutions in which sodium sulfide nonahydrate was dissolved in distilled water at certain concentrations, and the hydrogen sulfide concentration is calculated from the measured value of the absorbance.

As illustrated in FIG. 2, it was found that the common logarithm of the hydrogen sulfide concentration in the rearing water was inversely proportional to the common logarithm of the output of the gas sensor within the range from 50 to 500 μM (μmol/L) of the hydrogen sulfide concentration in the rearing water.

Thus, it was demonstrated that the hydrogen sulfide concentration in the rearing water can be controlled to be within a suitable range by setting a threshold value of the on-off operation by the relay 51 based on the relationship between the hydrogen sulfide concentration in the rearing water and the sensor output.

Example 2

Figure 3:
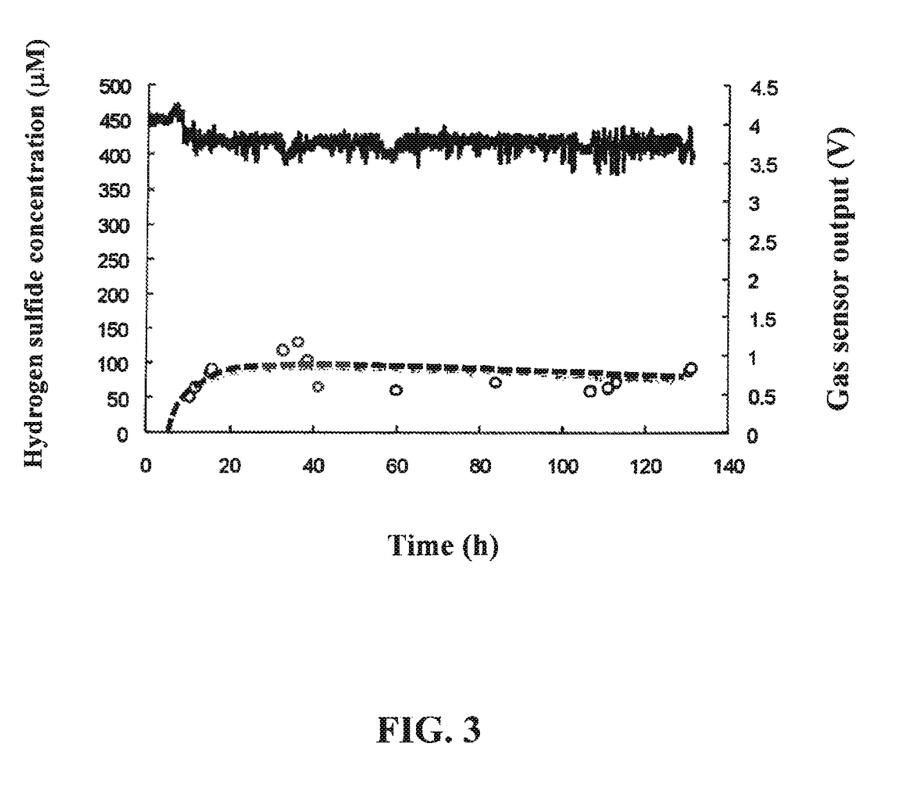
FIG. 3 is a graph illustrating change of the output value of the gas sensor over time as well as change of the estimated hydrogen sulfide concentration in rearing water over time measured by methylene blue method.

FIG. 3 is a graph illustrating change of the output value of the gas sensor over time as well as change of the estimated hydrogen sulfide concentration in the rearing water measured by the methylene blue method over time.

In order to confirm that the hydrogen sulfide concentration in the rearing water is practically controllable, an experiment was conducted to demonstrate that the hydrogen sulfide concentration can be maintained within the range from 50 to 150 (μmol/L), which is suitable for rearing deep-sea aquatic organisms.

As with the previously-described embodiment, the hydrogen sulfide concentration in the rearing water was measured by collecting the water over time and carrying out the measurement by the diamine method.

The volume of the rearing water was 150 liters, and the apparatus was set such that the temperature, dissolved oxygen concentration and pH of the rearing water were maintained respectively at 5° C., 6.4 and 7.4.

The gas sensor was set such that the output reaches 4.0 V in the clean air. The relay 51 was set such that the solenoid valve 54 and the tubing pump 56 are turned off when the output of the gas sensor decreases to 3.8 V or less, and the solenoid valve 54 and the tubing pump 56 are turned on when the sensor output value rises over 3.8 V.

The output value of the gas sensor was recorded every minute by using a data logger 52. Eight hours after starting to record the output value of the gas sensor, the solenoid valve 54 of the hydrogen sulfide cylinder 53 is opened to start the supply of the hydrogen sulfide gas. The flow rate of the tubing pump 56 was set to 10 ml/min.

As illustrated in FIG. 3, after starting the supply of hydrogen sulfide gas, the output value of the gas sensor was maintained between 3.7 V and 3.9V. The rearing water W was collected over time, and the hydrogen sulfide concentration in each collected rearing water was measured by the diamine method. It was found that the hydrogen sulfide concentration in the rearing water W can be maintained between 52 μM and 131 μM.

Figure 4:
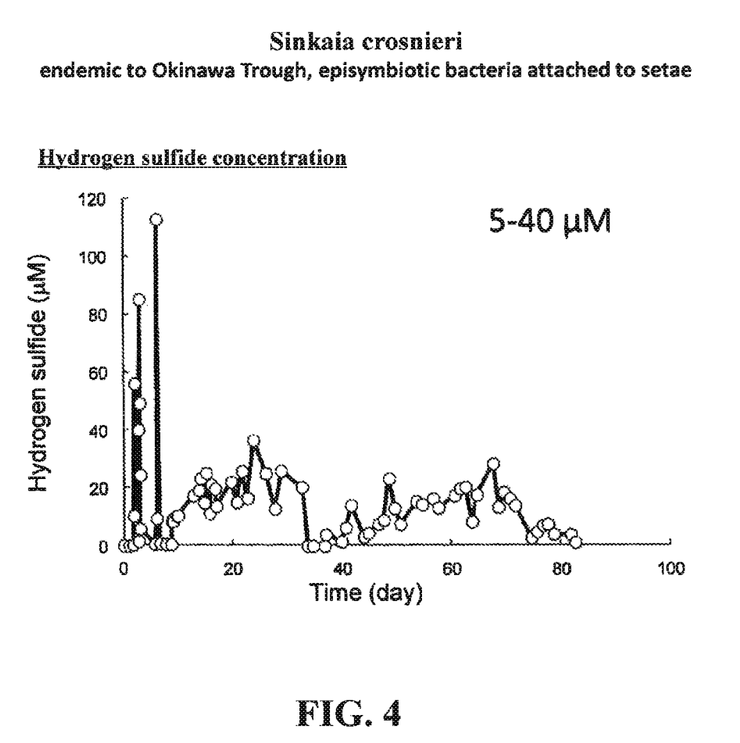
FIG. 4 is a graph illustrating the relationship between hydrogen sulfide concentration and elapsed time.
Figure 5:
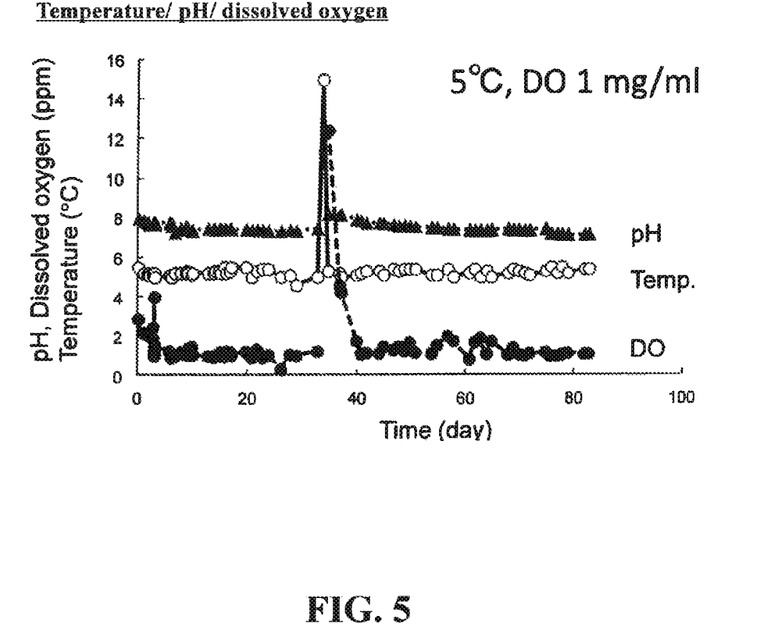
FIG. 5 is a graph illustrating the relationship between temperature/pH/dissolved oxygen and elapsed time.
Figure 6:
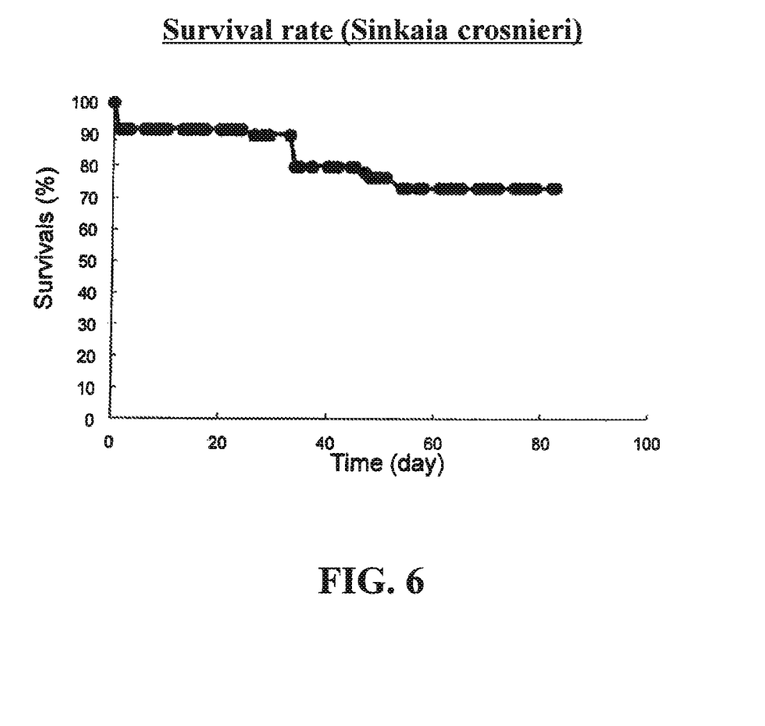
FIG. 6 is a graph illustrating the relationship between survival rate and elapsed time.

FIG. 4 is a graph illustrating the relationship between hydrogen sulfide concentration and elapsed time, FIG. 5 is a graph illustrating the relationship between temperature/pH/dissolved oxygen and elapsed time, and FIG. 6 is a graph illustrating the relationship between survival rate and elapsed time.

By using the aquatic organism rearing system having the above-described configuration, the present inventors reared a Shinkaia crosnieri, which is a living organism of chemosynthetic ecosystems that utilizes hydrogen sulfide. The advantageous results as illustrated in FIGS. 4 to 6 were obtained.

A deep-sea crab "Shinkaia crosnieri" can be reared under the presence of hydrogen sulfide for 80 days.

When Shinkaia crosnieri was reared while adding hydrogen sulfide, the episymbiotic bacteria thereof were increased to be at a concentration over 1000 times higher than that of the case without addition of hydrogen sulfide.

Many of the detected families of the increased episymbiotic bacteria are closely related to accepted deep-sea symbiotic bacteria.

A bacteria mat mainly composed of collaterally-generated deep-sea sulfur-oxidizing bacteria was grown in the rearing water tank.

The present invention is not limited to the above-described embodiments, and following changes may be made.

In the above-described embodiments, the hollow fiber module is used as an example of the oxygen removing device for removing dissolved oxygen in the rearing water W. However, any device capable of removing dissolved oxygen in the rearing water W may be used.

In the above-described embodiments, the hollow fiber module is used as an example of the hydrogen sulfide gas supplying device for supplying hydrogen sulfide gas to the rearing water. However, any device capable of supplying hydrogen sulfide to the rearing water may be used.

REFERENCE SIGNS LIST 10 water tank
22 oxygen removing device, hydrogen sulfide gas supplying device (hollow fiber module)
24 dissolved oxygen controller (dissolved oxygen meter)
25 air pump
26 vacuum pump
30 temperature sensor
50 gas sensor
51 relay
53 hydrogen sulfide cylinder
54 solenoid valve
56 circulation pump (tubing pump)
C temperature controlling device
F hydrogen sulfide supplying means
H dissolved oxygen level controlling means
W rearing water

The invention claimed is:

1. An aquatic organism rearing apparatus, comprising:
a water tank that stores rearing water leaving a gas phase at an upper part;
a gas sensor to detect a hydrogen sulfide gas concentration in the gas phase; and
a hydrogen sulfide supplying means to supply hydrogen sulfide to the rearing water based on a detection signal output from the gas sensor so as to maintain a hydrogen sulfide concentration in the rearing water at a predetermined value.

2. The aquatic organism rearing apparatus according to claim 1, wherein the predetermined value is a hydrogen sulfide concentration appropriate for an aquatic organism in the rearing water.

3. The aquatic organism rearing apparatus according to claim 1, further comprising:
a temperature controlling device that comprises:
a temperature sensor to detect a temperature of the rearing water; and
a temperature controller to control the temperature of the rearing water based on the detected temperature by the temperature sensor.

4. The aquatic organism rearing apparatus according to claim 1, wherein the hydrogen sulfide supplying means comprises:
a hydrogen sulfide cylinder filled with hydrogen sulfide gas;
a hydrogen sulfide gas supplying device to supply the hydrogen sulfide gas to the rearing water;
a solenoid valve to release and shut off supply of the hydrogen sulfide gas from the hydrogen sulfide cylinder to the hydrogen sulfide gas supplying device;
a circulation pump to circulate the rearing water; and
a relay to operate the solenoid valve and the circulation pump in an on-off manner based on the detection signal of the gas sensor.

5. The aquatic organism rearing apparatus according to claim 1, further comprising a dissolved oxygen level controlling means to control a level of dissolved oxygen in the rearing water.

6. The aquatic organism rearing apparatus according to claim 5, wherein the dissolved oxygen level controlling means comprises:
an oxygen removing device to remove the dissolved oxygen in the rearing water;
an air pump to supply oxygen to the rearing water;
a vacuum pump to allow an oxygen removing device to remove the dissolved oxygen in the rearing water; and
a dissolved oxygen controller to calculate the level of the dissolved oxygen and to correctly operate the air pump and the vacuum pump in an on-off manner based on a calculated value of the level of the dissolved oxygen so as to control the level of the dissolved oxygen.

7. The aquatic organism rearing apparatus according to claim 1, wherein the gas sensor is a semiconductor sensor.

8. The aquatic organism rearing apparatus according to claim 1, wherein the rearing water is sea water or artificial sea water.

9. The aquatic organism rearing apparatus according to claim 1, wherein calcium carbonate or a calcium carbonate-based pH adjusting member is disposed in the rearing water.

10. An aquatic organism rearing method using the aquatic organism rearing apparatus according to claim 1, comprising:
detecting the hydrogen sulfide gas concentration in the gas phase by the gas sensor; and
supplying hydrogen sulfide to the rearing water by the hydrogen sulfide supplying means based on the detection signal output from the gas sensor so as to maintain the hydrogen sulfide concentration in the rearing water at a constant value.

11. The aquatic organism rearing apparatus according to claim 2, further comprising:
a temperature controlling device that comprises:
a temperature sensor to detect a temperature of the rearing water; and
a temperature controller to control the temperature of the rearing water based on the detected temperature by the temperature sensor.

12. The aquatic organism rearing apparatus according to claim 2, wherein the hydrogen sulfide supplying means comprises:
a hydrogen sulfide cylinder filled with hydrogen sulfide gas;
a hydrogen sulfide gas supplying device to supply the hydrogen sulfide gas to the rearing water;
a solenoid valve to release and shut off supply of the hydrogen sulfide gas from the hydrogen sulfide cylinder to the hydrogen sulfide gas supplying device;
a circulation pump to circulate the rearing water; and a relay to operate the solenoid valve and the circulation pump in an on-off manner based on the detection signal of the gas sensor.

13. The aquatic organism rearing apparatus according to claim 3, wherein the hydrogen sulfide supplying means comprises:
    a hydrogen sulfide cylinder filled with hydrogen sulfide gas;
    a hydrogen sulfide gas supplying device to supply the hydrogen sulfide gas to the rearing water;
    a solenoid valve to release and shut off supply of the hydrogen sulfide gas from the hydrogen sulfide cylinder to the hydrogen sulfide gas supplying device;
    a circulation pump to circulate the rearing water; and
    a relay to operate the solenoid valve and the circulation pump in an on-off manner based on the detection signal of the gas sensor.

14. The aquatic organism rearing apparatus according to claim 2, further comprising a dissolved oxygen level controlling means to control a level of dissolved oxygen in the rearing water.

15. The aquatic organism rearing apparatus according to claim 3, further comprising a dissolved oxygen level controlling means to control a level of dissolved oxygen in the rearing water.

16. The aquatic organism rearing apparatus according to claim 4, further comprising a dissolved oxygen level controlling means to control a level of dissolved oxygen in the rearing water.

17. The aquatic organism rearing apparatus according to claim 14, wherein the dissolved oxygen level controlling means comprises:
    an oxygen removing device to remove the dissolved oxygen in the rearing water;
    an air pump to supply oxygen to the rearing water;
    a vacuum pump to allow an oxygen removing device to remove the dissolved oxygen in the rearing water; and
    a dissolved oxygen controller to calculate the level of the dissolved oxygen and to correctly operate the air pump and the vacuum pump in an on-off manner based on a calculated value of the level of the dissolved oxygen so as to control the level of the dissolved oxygen.

18. The aquatic organism rearing apparatus according to claim 15, wherein the dissolved oxygen level controlling means comprises:
    an oxygen removing device to remove the dissolved oxygen in the rearing water;
    an air pump to supply oxygen to the rearing water;
    a vacuum pump to allow an oxygen removing device to remove the dissolved oxygen in the rearing water; and
    a dissolved oxygen controller to calculate the level of the dissolved oxygen and to correctly operate the air pump and the vacuum pump in an on-off manner based on a calculated value of the level of the dissolved oxygen so as to control the level of the dissolved oxygen.

19. The aquatic organism rearing apparatus according to claim 16, wherein the dissolved oxygen level controlling means comprises:
    an oxygen removing device to remove the dissolved oxygen in the rearing water;
    an air pump to supply oxygen to the rearing water;
    a vacuum pump to allow an oxygen removing device to remove the dissolved oxygen in the rearing water; and
    a dissolved oxygen controller to calculate the level of the dissolved oxygen and to correctly operate the air pump and the vacuum pump in an on-off manner based on a calculated value of the level of the dissolved oxygen so as to control the level of the dissolved oxygen.

\* \* \* \* \*